INVENTOR
J. C. EWIN
BY
SE Hollander
ATTORNEY

TELEPHONE CONCENTRATOR SIGNALING SYSTEM

Filed Aug. 17, 1962 8 Sheets-Sheet 2

INVENTOR
J. C. EWIN
BY
S E Hollander
ATTORNEY

TELEPHONE CONCENTRATOR SIGNALING SYSTEM

Filed Aug. 17, 1962

8 Sheets-Sheet 3

INVENTOR
J. C. EWIN
BY
SE Hollander
ATTORNEY

INVENTOR
J. C. EWIN
BY S F Hollander
ATTORNEY

FIG. 6

TABLE I

STATE DIAGRAM FOR SIGNALING SEQUENCE

| | | | | | | | | |
|---|---|---|---|---|---|---|---|---|
| STATE | | 1 | 2 | 3 | 4 | 5 | 6 | 7 |
| TRANSMITTING SIGNAL | | S | P | S | N | S | P | N |
| RECEIVING SIGNAL | | S | S | N | S | P | P | N |
| LOOP CURRENT | | 0 | + | − | − | + | + | − |
| EXAMINE LOOP CURRENT | | | | 0 | | 0 | + | − |
| DIGIT REGISTERED | | STANDBY | 0 | 0 | 1 | 1 | 0 | 1 |
| REPLY | | | N | | P | | N | P |
| LOOP CURRENT (ON REPLY) | | | 0 | 0 | 0 | 0 | 0 | 0 |
| ADVANCE TO STATE TO TRANSMIT | DIGIT 0 | 2 | 3 | 2 | 6 | 2 | 3 | 6 |
| | DIGIT 1 | 4 | 7 | 4 | 5 | 4 | 7 | 5 |
| ADVANCE TO STATE FOR STANDBY | | | | 1 | | 1 | | |

P—POSITIVE
N—NEGATIVE
S—STANDBY

INVENTOR
J. C. EWIN
BY SEHollander
ATTORNEY

FIG. 7

TABLE II

| LINE NO. DECIMAL | REGISTER NO. BINARY | | | | | |
|---|---|---|---|---|---|---|
| | R1 | R2 | R3 | R4 | R5 | R6 |
| 1 | 0 | 0 | 1 | 1 | 0 | 0 |
| 2 | 0 | 0 | 1 | 1 | 0 | 1 |
| 3 | 0 | 0 | 1 | 1 | 1 | 0 |
| 4 | 0 | 0 | 1 | 1 | 1 | 1 |
| 5 | 0 | 1 | 0 | 0 | 0 | 0 |
| 6 | 0 | 1 | 0 | 0 | 0 | 1 |
| 7 | 0 | 1 | 0 | 0 | 1 | 0 |
| 8 | 0 | 1 | 0 | 0 | 1 | 1 |
| 9 | 0 | 1 | 0 | 1 | 0 | 0 |
| 10 | 0 | 1 | 0 | 1 | 0 | 1 |
| 11 | 0 | 1 | 0 | 1 | 1 | 0 |
| 12 | 0 | 1 | 0 | 1 | 1 | 1 |
| 13 | 0 | 1 | 1 | 0 | 0 | 0 |
| 14 | 0 | 1 | 1 | 0 | 0 | 1 |
| 15 | 0 | 1 | 1 | 0 | 1 | 0 |
| 16 | 0 | 1 | 1 | 0 | 1 | 1 |
| 17 | 0 | 1 | 1 | 1 | 0 | 0 |
| 18 | 0 | 1 | 1 | 1 | 0 | 1 |
| 19 | 0 | 1 | 1 | 1 | 1 | 0 |
| 20 | 0 | 1 | 1 | 1 | 1 | 1 |
| 21 | 1 | 0 | 0 | 0 | 0 | 0 |
| 22 | 1 | 0 | 0 | 0 | 0 | 1 |
| 23 | 1 | 0 | 0 | 0 | 1 | 0 |
| 24 | 1 | 0 | 0 | 0 | 1 | 1 |
| 25 | 1 | 0 | 0 | 1 | 0 | 0 |
| 26 | 1 | 0 | 0 | 1 | 0 | 1 |
| 27 | 1 | 0 | 0 | 1 | 1 | 0 |
| 28 | 1 | 0 | 0 | 1 | 1 | 1 |
| 29 | 1 | 0 | 1 | 0 | 0 | 0 |
| 30 | 1 | 0 | 1 | 0 | 0 | 1 |
| 31 | 1 | 0 | 1 | 0 | 1 | 0 |
| 32 | 1 | 0 | 1 | 0 | 1 | 1 |
| 33 | 1 | 0 | 1 | 1 | 0 | 0 |
| 34 | 1 | 0 | 1 | 1 | 0 | 1 |
| 35 | 1 | 0 | 1 | 1 | 1 | 0 |
| 36 | 1 | 0 | 1 | 1 | 1 | 1 |
| 37 | 1 | 1 | 0 | 0 | 0 | 0 |
| 38 | 1 | 1 | 0 | 0 | 0 | 1 |
| 39 | 1 | 1 | 0 | 0 | 1 | 0 |
| 40 | 1 | 1 | 0 | 0 | 1 | 1 |
| 41 | 1 | 1 | 0 | 1 | 0 | 0 |
| 42 | 1 | 1 | 0 | 1 | 0 | 1 |
| 43 | 1 | 1 | 0 | 1 | 1 | 0 |
| 44 | 1 | 1 | 0 | 1 | 1 | 1 |
| 45 | 1 | 1 | 1 | 0 | 0 | 0 |
| 46 | 1 | 1 | 1 | 0 | 0 | 1 |
| 47 | 1 | 1 | 1 | 0 | 1 | 0 |
| 48 | 1 | 1 | 1 | 0 | 1 | 1 |
| 49 | 1 | 1 | 1 | 1 | 0 | 0 |
| 50 | 1 | 1 | 1 | 1 | 0 | 1 |

INVENTOR
J. C. EWIN
BY
S. E. Hollander
ATTORNEY

INVENTOR
J. C. EWIN
BY
S E Hollander
ATTORNEY

INVENTOR
J. C. EWIN
BY S E Hollander
ATTORNEY

United States Patent Office 3,177,292
Patented Apr. 6, 1965

3,177,292
TELEPHONE CONCENTRATOR SIGNALING SYSTEM

James C. Ewin, Colonia, N.J., assignor to Bell Telephone Laboratories, Incorporated, New York, N.Y., a corporation of New York Filed Aug. 17, 1962, Ser. No. 218,228
24 Claims. (Cl. 179—18)

This invention relates to telephone line concentrator systems and more particularly to signaling systems for line concentrators in which a single control trunk is utilized for all signaling requirements.

Line concentrator systems are utilized in telephone practice for extending a relatively larger number of lines over a smaller number of trunks to a telephone central office. A remote line concentrator or switching unit located in the field, and at which the lines are terminated, is adapted under control of the central office to connect the lines to the trunks on a shared basis as required.

The obvious advantage in line concentration is the preclusion of the necessity for extending each line directly to the central office. However, the copper and other savings realized as a result of concentration are threatened, at least to some extent, by the very fact that the line is no longer directly connected to the office.

In short, whereas in direct connected telephone systems, a complete and continuous path exists to each substation to recognize supervisory conditions including service requests, disconnects, etc., the processing of such routine signals on a telephone line assumes challenging proportions in a concentrator arrangement specifically because the lines are no longer in direct communication with the office but are, instead, terminated at a remote location.

Thus, when a substation line goes off hook, indicating a service request call, facilities must be provided in a concentrator system to recognize this condition and to report its existence along with the identity of the calling substation line to the office in order to energize equipment at the office for extending a trunk connection to the calling line.

The manner in which this has been achieved in certain prior units includes the utilization of so-called "dynamic" scanning in which a continuous train of interrogation pulses is delivered to each substation line in time sequence from the central office, and so-called "passive" scanning in which a service request condition is transmitted from the remote unit to the central office by energizing particular coded conductors, for example, on a three-out-of-eight basis to identify the calling line.

Both of these arrangements, although completely operative and useful, involve a substantial number of control or signaling channels. That this arrangement is at least partially self-defeative when utilized in a line concentrator context is evident since the prime purpose of line concentration is to reduce the number of channels extending to the central office and since control signaling and the attendant additional control channels requisite thereto are obviously not required in direct connected systems.

It is therefore an object of this invention to provide a telephone line concentrator signaling arrangement in which control signaling is performed over a single control channel.

An additional object of this invention is to provide a signaling system for telephone line concentrators in which control signal information from the remote unit to the central office and from the central office to the remote unit takes place over the same single control trunk.

As is manifest from the above discussion, the central office is wholly dependent on transmitted control information from the remote unit relative to line supervisory conditions and line identification. As a result, it is critically necessary that the information thus transmitted be completely accurate. In fact, the criticality of this requirement is such that in certain prior art units the checking procedures undertaken to insure accuracy have developed into highly sophisticated and complex facilities. Here again, since this equipment is unnecessary in direct connected line systems, any special facilities which are required solely for transmitting checking information tend to diminish the economic efficiency of the line concentrator.

Nevertheless, despite their intricacy, certain prior art checking devices were capable merely of ascertaining at the transmitting end, for example, that the information thus transmitted was transmitted accuraely but were not adapted to ascertain that the information, although accurately transmitted, was also accurately received, i.e., certain prior checking devices were incapable of ascertaining that the received information precisely duplicated the transmitted information. For this reason errors in transmission could not be detected.

It is therefore an object of this invention to provide maximum accuracy in transmission and reception of control information.

Still another object of this invention is to provide for the verification of transmitted information upon its reception at the receiving unit.

A further object of this invention is to insure that received signals precisely resemble transmitted signals.

In certain prior art signaling facilities which provided bidirectional operation over a common control trunk, interaction between transmitters at the two units was usually carefully avoided. Thus, for example, when a signaling arrangement included a transmitter and receiver at the remote unit and a corresponding transmitter and receiver at the central office, both connectable to a common control channel, a particular transmitter and the opposite or remote receiver could be interconnected over the trunk. In order to transmit calling line identification, for example, the transmitter at the remote unit would be coupled to the receiver at the central office while the receiver at the remote unit and the transmitter at the central office were both de-energized.

Correspondingly, to transmit information relative to a called line number on a terminating call, the transmitter at the central office would be coupled to the receiver at the remote unit while the remaining transmitting and receiving equipment were de-energized.

Thus, although these transmitting facilities were alleged to be bidirectional in nature, they were, in fact, capable of operating only unidirectionally when viewed at any particular time. In short, the office could transmit to the remote unit or the remote unit could transmit to the office but these functions were required to be performed sequentially and not simultaneously. The hallmark of this type of concentrator signaling operation resides in the fact that the two transmitters at the distant ends are never connected to the control channel at the same time since interference would result. In fact, a number of prior art units required "master" signal control circuitry which would allocate preference or priority to one of the two transmitters and actually lock out the other until the preferred transmitter has terminated operation.

It is therefore an object of this invention to provide a telephone concentrator signaling system in which transmitters at distant ends of a control channel may be simultaneously connected to the channel.

Still another object of this invention is to provide a signaling system in which a portion of the signaling function is achieved by the combined simultaneous operation of the transmitters at the distant ends.

Although completely operative and useful, a number of prior art line concentrator signaling systems exhibited the disadvantage of requirements pertaining to marginal signaling conditions.

Thus, if the signaling system required the receiver to distinguish between a positive signal of a first level and a positive signal of a higher level the threat of inaccuracy was present as a result of variations in battery potential at the central office or ground potential differences between the central office and the remote concentrator. In consequence of such variations, receiving equipment may be impeded in distinguishing between the two threshold conditions.

Since the accuracy of signal transmission and reception is paramount in line concentration systems in view of the isolation of the substation line from its traditional direct connection to the office, it is an object of this invention to provide a nonmarginal line concentrator signaling system.

Certain prior line concentrator signaling systems which attempted to overcome the handicaps imposed by marginal signaling have required complex and costly facilities. Since the purpose of line concentrators is in over-all effect to achieve economies in the connection of telephone substations to a telephone central office, expenditures on signaling systems may prove detrimental to the over-all economic goal.

It is, therefore, an additional object of this invention to provide telephone line concentrator signaling facilities having nonmarginal requirements of simple and inexpensive construction.

Certain prior line concentrator signaling systems which required a substantial number of conductors between the line concentrator and the central office exclusively reserved for signaling purposes have utilized ground return paths for the signaling loops in an effort to conserve conductor allotments to control signaling. The disadvantages of this type of arrangement are manifest despite the reduction in the total number of conductors required for signaling since the loop is now subject to variations in ground potential between the remote concentrator unit and the central office which impose even more rigorous requirements as discussed above on marginal type signaling systems.

It is, therefore, an object of this invention to provide a line concentrator signaling system utilizing a single control loop or pair of control conductors without a ground return.

As indicated above, the present invention is directed to arrangements for impressing signaling conditions on both ends of a control loop concurrently and simultaneously. Although a number of decisive benefits flow from this departure from the conventional bidirectional signaling arrangement in which signals are applied to one end or the other of the signaling loop individually, new problems arise in view of the nonmarginal aspects of the present invention.

Thus, if it is assumed that a positive signal is applied at the line concentrator end of the control signaling loop and a reply signal also in the positive sense is applied at the central office end of the control loop, the two signals reinforce each other and create a double strength positive signal. Under these circumstances if the following signal applied at the concentrator unit end is again positive while the reply positive signal persists, the central office or receiving end of the control loop, since it is nonmarginal in operation, cannot discern whether the signal which subsists on the control loop is due to the positive signal applied at the sending or concentrator end (newly applied) or due to the reply signal applied at the central office or receiving end.

It is, therefore, an additional object of this invention to provide for the resolution of ambiguities where signals of like sense are applied at both the transmitting and receiving ends of the control loop.

These and other objects of the invention may be realized in a specific illustrative embodiment in which a signaling circuit in accordance with my invention is described in combination with a remote line concentrator system. Illustratively, the concentrator is considered to be a universal line concentrator in which there is an individual and unique appearance for each concentrated line at the central office. Thus, an over-all view of the system would include a relatviely larger number of remote substation lines which are terminated at a remote switching circuit. The remote switching circuit is coupled to the central office portion of the concentrator over a relatively smaller number of trunks. At the central office portion of the concentrator, the trunks are coupled to an expansion network which permits connection to the individual line terminations in a conventional central office unique to each subscriber's line.

In response to a line off-hook condition or service request, for example, at a remote substation, the remote concentrator through a service request matrix, similar to that described in my Patent 3,022,382 of February 20, 1962, identifies the line requesting service. In the present arrangement a conventional translation is made to a binary representation of the identity of the line and the representation is stored in a register circuit. The register circuit is coupled to a signaling circuit at the remote unit which extends to a counterpart signaling circuit at the central office over a single control trunk.

The signaling circuit is thereafter actuated to transmit from the remote unit to the central office the identity of the line requesting service which information is stored in a corresponding register circuit at the central office.

In essence, the signaling is performed by the application of trinary signaling potentials at both ends of the control trunk in accordance with a particular order as described in Table I herein.

For example, if the first digit of the binary representation of the line requesting service is "1," then, as shown herein, a negative signal (state 4) is applied at the remote unit to the control trunk. Upon reception of the negative signal over the control trunk, the signaling circuit at the central office, in effect, compares the present (negative) signal on the line with the previous (standby) signal and through a logic arrangement determines that the digit transmitted is a binary 1 which is thereupon stored in a binary register at the central office. Thereafter the central office "replies," also as dictated in Table I (FIG. 6) herein, by applying a positive signal to the central office end of the control trunk to verify reception of the digit and to ready the distant unit for transmitting a subsequent digit.

It will be noted that the central office reply or positive signal is applied concurrently with the application of the negative signal at the remote unit. The interaction of the opposing signals results in an effective loop current which is substantially zero, thereby releasing all detector equipment on the loop and also releasing the remote signaling equipment. Ultimately, the positive signal remains alone on the loop.

Subsequently, the remote unit initiates transmission of the second digit which may illustratively be a binary 0 by the application of a particular potential at the distant end of the control trunk which is determined by a comparison of the previous signal transmitted and the binary digit to be transmitted. Thus, in accordance with Table I, since the previous signal is a negative current condition and since the digit to be transmitted is a binary 0, the signal to be applied is a positive signal (state 6).

The central office senses the positive signal and registers a binary 0 replying with a negative signal. Again the signals interact and the loop current is reduced to substantially zero which serves to verify reception of the signal and readies the remote unit for transmitting a third digit. The remaining digits are transmitted in an analogous manner.

A feature of this invention includes a line concentrator signaling system utilizing a single control trunk.

Another feature of this invention includes a concentrator signaling system wherein a single control trunk is utilized bidirectionally.

A further feature of this invention includes a signaling system wherein the collective effect of simultaneous signals applied to distant ends of a control trunk are utilized for signal transmission.

Still another feature of this invention includes circuitry for applying trinary signals to a control trunk to transmit binary data.

Another feature of this invention includes a signaling circuit wherein the identity of a binary digit is determined by a comparison of present and previous current conditions on a control trunk.

Still another feature of this invention includes a verification signal from the receiving unit to the transmitting unit to indicate the reception of each binary digit and to prepare the sending unit for transmitting an additional digit.

A further feature of this invention includes facilities for providing nonmarginal relay signaling systems for line concentrators.

An additional feature of this invention includes facilities for utilizing receiving equipment which is sensitive to distinctions between positive, negative and zero current on the loop but insensitive to positive or negative currents of varying intensity.

A further feature of this invention includes facilities effective upon the concurrent application of signals of like sense at both ends of a signaling loop for discerning the signal applied at the transmitting end of the loop.

Still another feature of this invention includes arrangements effective upon the application of signaling of like sense at both ends of the signalling loop for briefly interrupting the signal applied at the receiving end of the loop and examining the remaining signal on the loop.

A further feature of this invention includes facilities effective upon the subsistence of a signal of like sense on the control loop in response to the transmission of an additional information bit to momentarily interrupt the signal applied at the receiving end of the loop and to examine the signal which remains on the control loop.

Still another feature of this invention includes facilities providing nonmarginal line concentrator signaling information on a single control loop which is exclusive of any ground connection.

These and other objects and features of the invention may be more readily comprehended from an examination of the following specification, appended claims and attached drawing in which:

Figure 2:
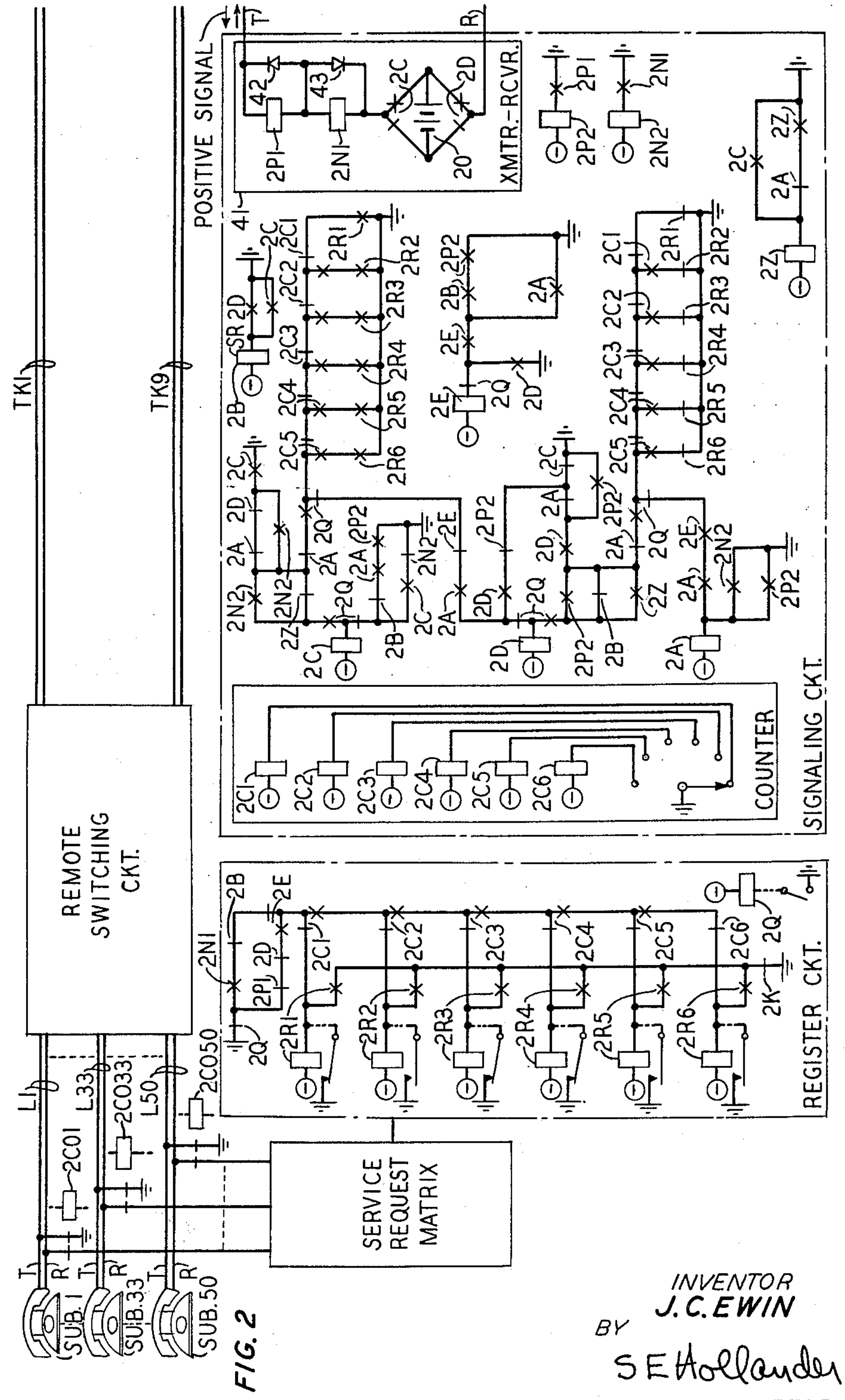
FIG. 2 shows, in detail, the circuitry at a remote concentrator location for practicing my inventions.
Figures 3, 4:
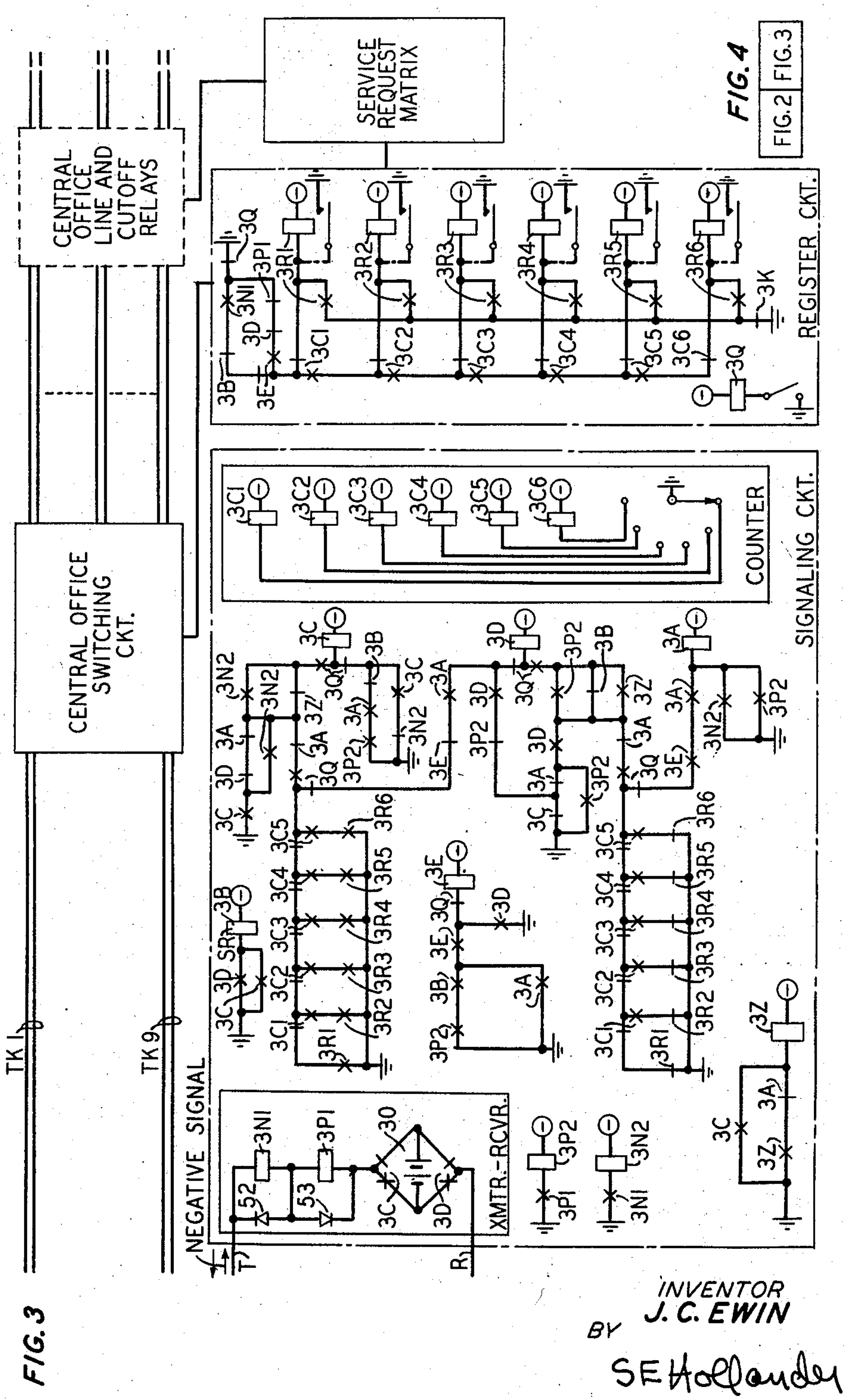
FIG. 3 shows the corresponding circuitry at the central office location.
Figure 5:
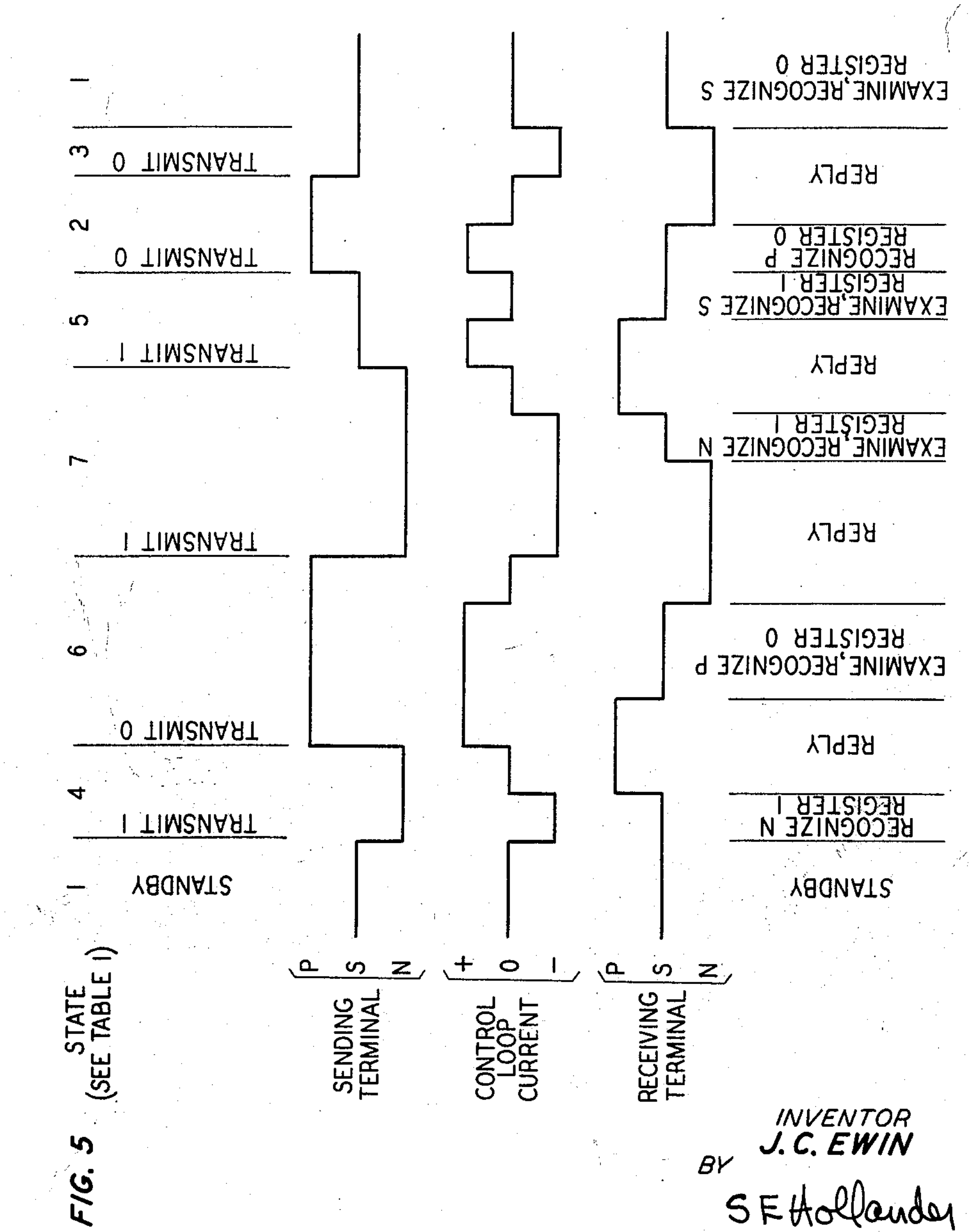
Figure 8:
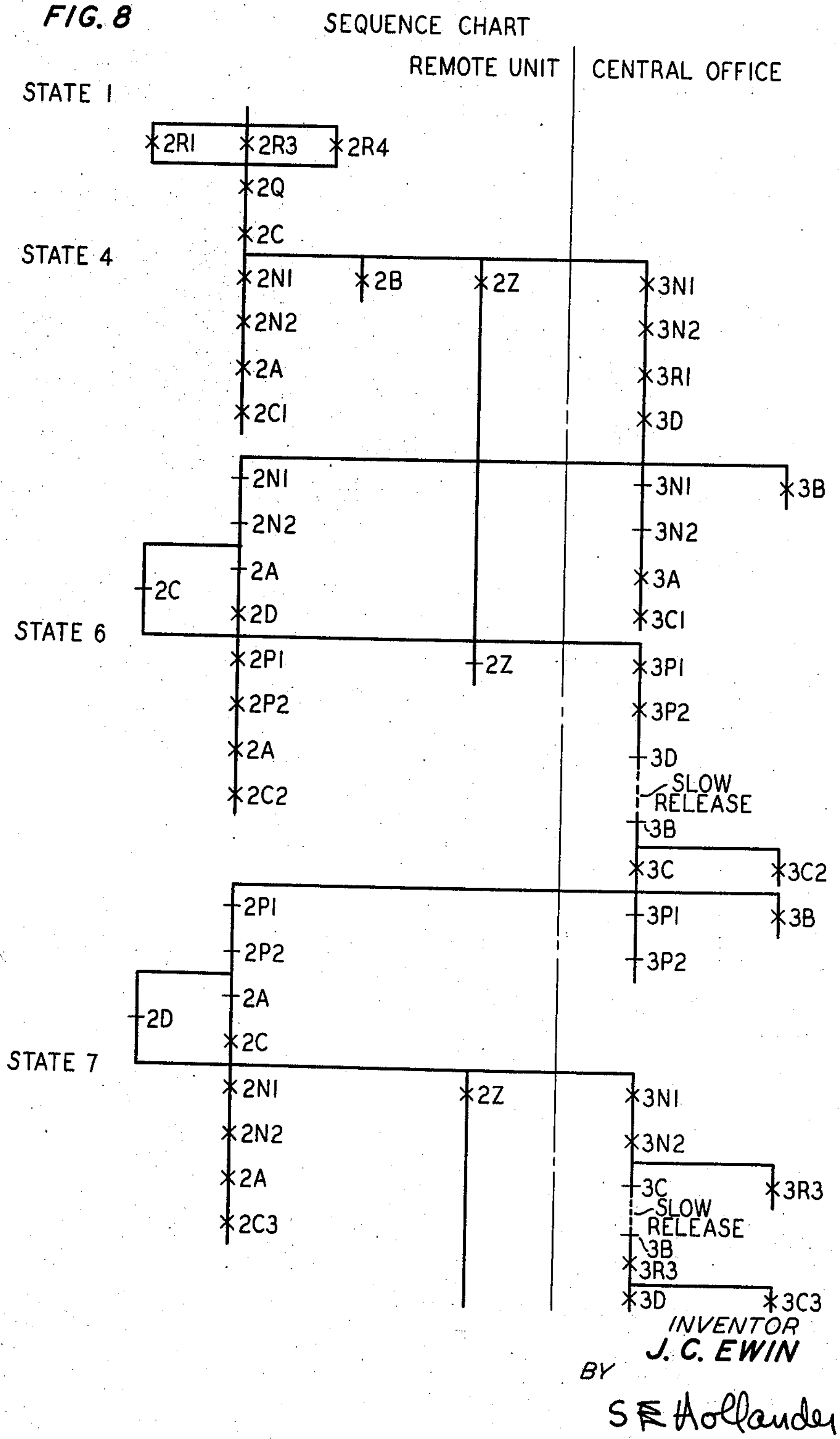
Figure 9:
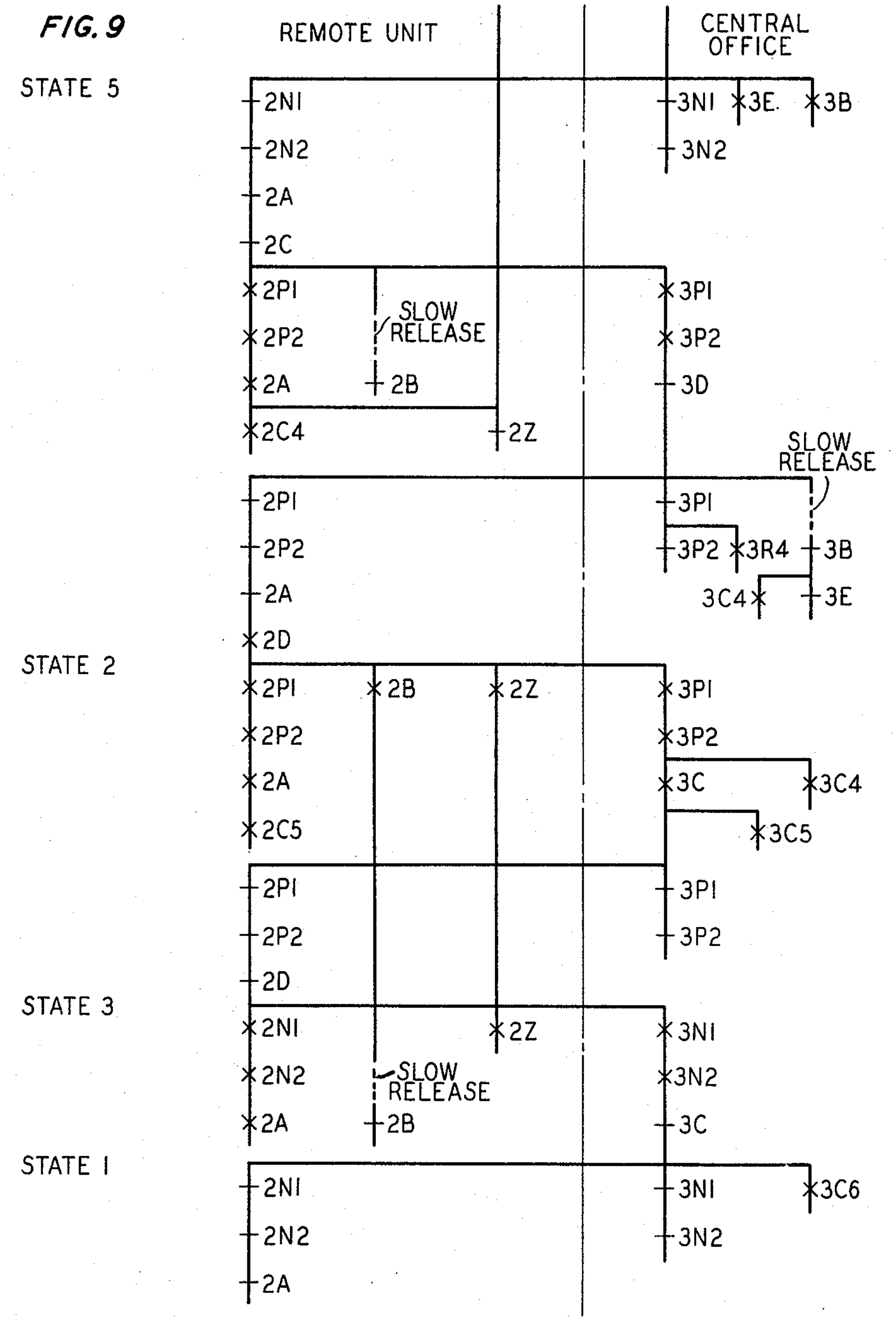

FIG. 4 indicates the disposition of FIGS. 2 and 3 to disclose the invention;

FIG. 5 is a pulse sequence chart which graphically depicts the application of signaling potentials at the remote location and the central office location on the control trunk and also shows the collective or resultant control loop current as a result of the application of simultaneous signals at both ends of the loop;

FIG. 6 includes Table I which indicates the appropriate trinary signals to be applied to the control trunk to transmit the desired binary data and the verification or "reply" signals;

FIG. 7 includes Table II which shows the relative decimal and modified binary equivalents of an illustrative fifty lines connected to the remote line concentrator; and FIGS. 8 and 9 are relay sequence charts indicating the time sequence of relay operation at the remote and control units.

GENERAL DESCRIPTION

Figure 1:
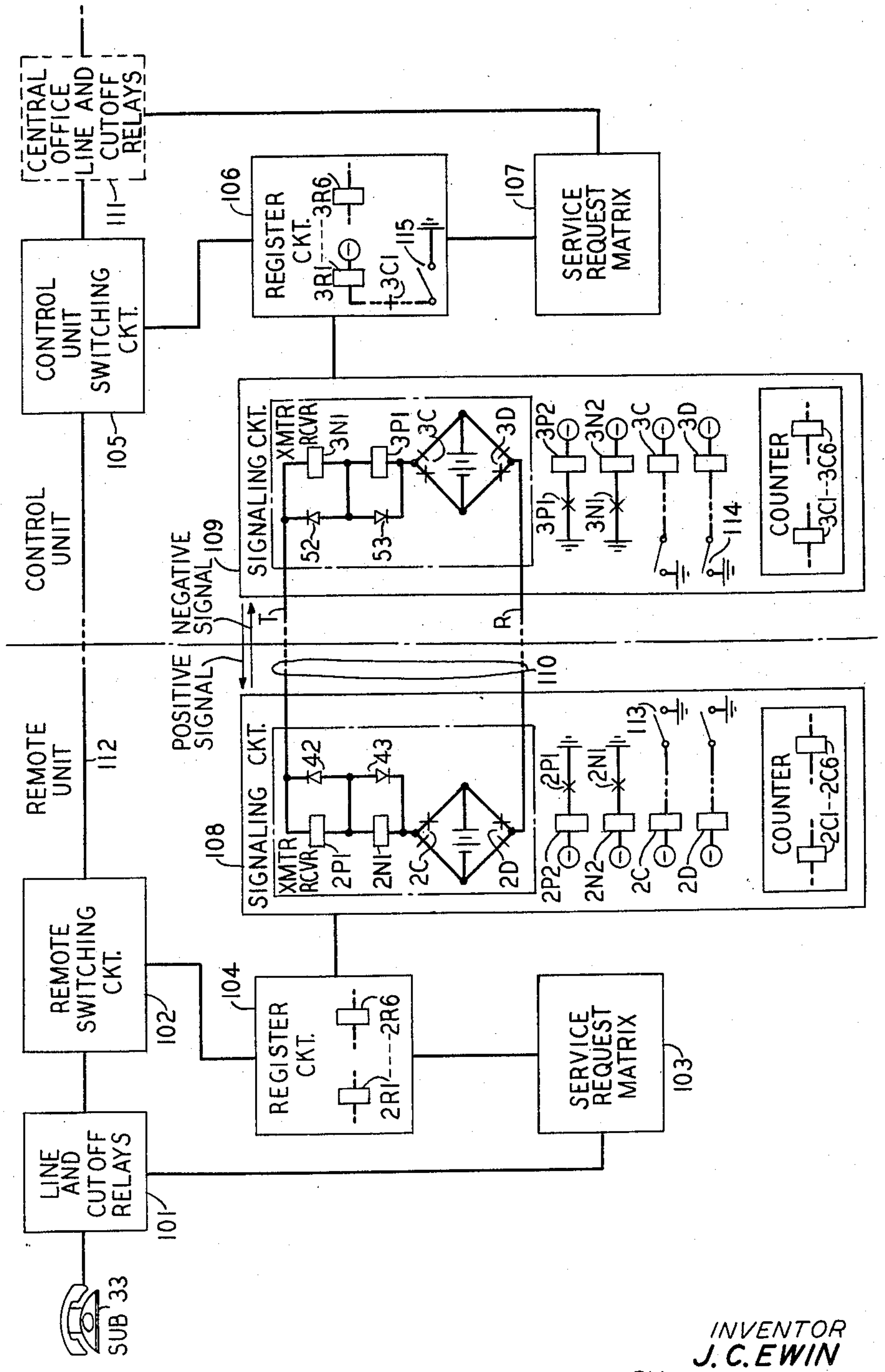
FIG. 1 shows an outline diagram of a telephone line concentrator system including my improved signaling arrangement.

Referring now to FIG. 1, the major components of a concentrator system in which the signaling system of the present invention may be suitably incorporated are shown.

The line and cutoff relays 101 at the remote unit include a sensory device such as a line relay responsive to the operation of individual lines to indicate a service request condition thereat. The cutoff relays perform the conventional function of cutoff equipment on an individual basis for each line by electrically isolating a particular line from its line relay during a conversation connection, thus providing the required "clean" tip and ring connection to the central office free of all bridging impedances. Although shown only in general outline, a suitable configuration for the line and cutoff relays is described in detail in my Patent 3,022,382 of February 20, 1962. The remote switching circuit 102 may illustratively include a crossbar switching arrangement, such as that shown in my above-referred-to patent, or other suitable switching devices for connecting a relatively larger number of lines, for example fifty, to a relatively smaller number of trunks, for example nine. The service request matrix 103 may illustratively include a group of coded relays divided into two subgroups. The identification of a particular line may be expressed in terms of one relay from an "A" group of relays and one relay from a "B" group of relays, also as shown in detail in my patent.

Register circuit 104 includes a group of register relays sufficient in number to store in modified binary format (Table II) the identification of all of the lines connected to the remote unit. As shown in detail in FIGS. 2 and 3, the register relays are either operated to store a binary 1 or allowed to remain in the released condition to store a binary 0.

The control unit switching circuit 105, register circuit 106, and service request matrix 107 may all be substantially similar to their counterparts at the remote unit as shown in FIGS. 2 and 3 in detail for the registers and also in my above-referred-to patent.

The signaling circuit 108 at the remote unit and 109 at the central office are coupled over a single control trunk 110 to deliver information between the remote unit and the central office bidirectionally as required. The signaling arrangement is predicated on the transmission and reception of trinary signaling conditions on the loop which include positive current on the loop of the control trunk 110, negative current on the loop and substantially zero current on the loop. For illustrative purposes herein, positive signal current on the loop will arbitrarily be considered as current on the tip conductor of trunk 110 in a direction from the central office to the remote unit whereas negative signal current is current in a direction on the tip conductor from the remote unit to the central office.

In signaling circuit 108 the operation of relay 2C is arranged to drive "negative" current in a direction to the central office on the tip conductor T, through the winding of relay 2N1, diode 42, tip conductor T, relay 3N1, diode 53 and return. In a similar manner, the operation of relay 3D is arranged to deliver a "positive" current on tip conductor of trunk 110 in a direction to the remote unit over a path including the winding of relay 3P1, diode 52, tip conductor T, winding of relay 2P1, diode 43 and return. Detector relays 2P1, 3P1, 2N1, and 3N1 are thus directly responsive to the trinary signaling conditions on the loop. Auxiliary relays 2P2, 2N2, 3P2, and 3N2 are similarly responsive to their respective detector relays. The counter circuits 2C1–2C6 and 3C1–3C6 are utilized to provide a register advance as each digit is stored in the corresponding digit register relay 2R– or 3R–.

For purposes of illustration it will be assumed that a substation 33 is initiating a call to a distant substation. When substation 33 goes off hook, a specific line relay, individual to substation 33 in the group of line and cutoff relays 101, will be operated to indicate the service request. In response to the operation of the specific line relay, corresponding "A" and "B" subgroup identification relays (not shown) will be operated in the service request matrix 103, all as described in detail in my above-referred-to patent. A further translation of the information thus stored in the service request matrix is then made by translating this information to binary form in accordance with Table II in a conventional manner. The binary digits are thereafter stored in register relays 2R1–2R6. Thus the register relays 2R1–2R6 will respectively store the binary digits 101100 (Table II) for line 33 wherein all those relays storing a binary 1 will be operated and those storing a binary 0 released.

Assuming that the register circuit now stores the Table II binary equivalent of substation 33, it is essential to transmit the substation identification to the central office in order that the specific line termination in the central office line and cutoff relays 111 unique to line 33 may be energized and moreover a path provided between substation 33 and its corresponding termination in the central office via the remote switching circuit 102, a selected speech trunk 112 and the control unit switching circuit 105.

The information is transmitted from the remote unit to the central office through the operation and release of relays 2C, 3C, 2D and 3D as required in accordance with Table I. Thus, since the first digit to be transmitted is a binary 1 and since the signaling circuit is theretofore in the standby or zero current condition (state 1), it is seen from Table I (state 4) that the signal to be transmitted from the remote unit corresponds to negative current on the loop. In consequence, relay 2C is operated as shown symbolically by switch 113, and explained in detail herein, to apply current to the tip conductor of the loop in a direction toward the central office which was arbitrarily considered to be negative current on the loop. Thereafter, the negative detector relays 2N1 and 3N1 are operated in response to the negative current on the loop. Subsequently, the central office "replies," as shown in Table I, by applying a positive signal to the loop through the operation of relay 3D as shown symbolically by switch 114 and indicated in detail in FIG. 3. Also the register relay 3R1 is operated to store the binary 1 as shown symbolically by switch 115 and the counter is advanced as a result of the operation of counting relays 2C1 and 3C1 as described hereinafter.

As seen in FIG. 5, the application of negative current on the loop from the remote unit sending terminal and positive current from the central office receiving terminal produce opposing currents which reduce the loop current to substantially zero, resulting in the release of all of the detector relays.

Thereafter, relay 2C is released in view of the release of relay 2N1 as explained in detail herein. However, relay 3D remains operated and as a result the remaining current on the loop is solely in a direction toward the remote unit or "positive."

Thus far it is seen that the digit 1 has been transmitted from the remote unit to the central office and stored in the register circuit 3R1 thereat. In addition, the counter relays 2C1 and 3C1 have advanced and the central office has "replied" by applying a positive current to the loop.

The second signal to be transmitted is a binary 0. Referring to Table I, it is seen that where the previous transmitted signal on the loop is negative (state 4) and a zero is to be transmitted, the remote unit is required to transmit a positive current condition (state 6) and the central office unit "replies" with a negative current condition. The positive current condition is produced at the remote unit by operating relay 2D. The counter is advanced by operating relays 2C1 and 3C1 after the zero has been stored in the second register 3R2 (not shown in FIG. 1, but shown in FIG. 3) by allowing relay 3R2 to remain released. Thus, the second binary digit or "0" is stored in the register at the central office.

Reference to Table I indicates that where the previous transmitted signal is a positive condition (state 6) and the following digit to be transmitted is a binary 1 (state 7), then the signal required to be applied at the transmitting terminal is a negative signal on the loop. Thus, relay 2C is once more operated to drive current in a direction toward the central office to operate the negative detector relays, and the register relay 3R3 (not shown in FIG. 1 but shown in FIG. 3) is energized to store the third digit or binary 1, whereupon the counting relays 2C3 and 3C3 are operated to advance the count. Thereafter, the reply is made by the central office by applying positive current on the loop as shown by Table I through the operation of relay 3C.

The remaining digits are transmitted in a similar manner (states 5, 2 and 3) by the operation and release of relays 2C, 2D, 3C and 3D to provide the required trinary signaling conditions on the loop in accordance with Table I. After each signal transmission and the storage in the register circuit relay of the transmitted binary digit, the counting relays are advanced until all of the digits are stored. Thereafter, the central office switching circuit is energized to provide a path over a speech trunk, for example trunk 112, which will extend substation 33 through the remote switching circuit 102, trunk 112, and the control unit switching circuit 105 to a termination in the central office line and cutoff relays 111 unique to substation 33.

It is significant to observe that the signaling conditions utilized in transmitting information from the remote unit to the central office include the simultaneous application of potentials at both ends of the control trunk 110 and the collective, joint, or resultant effect on the over-all loop current is a criterion in determining the particular binary digit transmitted.

Having thus described the invention in general terms, a detailed description follows, the comprehension of which will be greatly facilitated by reference to FIGS. 5, 6, 8 and 9, all of which have been keyed to the seven distinct signaling "states" of the transmitter, receiver and signaling trunk.

DETAILED DESCRIPTION

Referring now to FIGS. 2 and 3, it will be assumed for illustrative purposes that the binary digits 101100 representing line 33, as shown in Table II, are to be transmitted to the central office as a result of an originating call by substation 33. The binary digits 101100 are stored in register relays 2R1–2R6 in the manner explained above. As described generally above, the information is transmitted over the single control trunk T and R in a direction from the remote unit to the central office.

*Transmit first digit, state 4*

Since the first digit to be transmitted is a binary 1, Table I indicates that with the loop current in the standby condition (state 1) a negative signal (state 4) (adapted to produce a current on the tip conductor in a direction toward the central office) must be transmitted to register a binary 1. In order to transmit the negative signal, relay 2C is operated over a path from negative battery, winding of relay 2C, and the contacts of relay 2Q previously operated in consequence of the storage of the entire binary number in the register circuit at the remote unit.

For purposes of clarity, relay 2Q is shown as being symbolically operated by a manual switch although it is apparent that various other arrangements may be used responsive to the storage of the complete binary number in the register circuit at the remote unit. In this respect it is seen that register relays 2R1–2R6 are either operated to store a binary 1 or allowed to remain released to store a binary 0 and as shown in FIG. 2 store the binary digits 101100 respectively.

Continuing with the operating path for relay 2C, the circuit is traced over the contacts of relays 2Q, 2Z, 2A, additional contacts of relay 2Q, contacts of relays 2C5–2C1, contacts of relay 2R1 to ground. Relays 2N1 and 3N1 operate as a result of the negative current on the loop due to the operation of relay 2C. The path for the operation of the latter relays may be traced from positive battery at the remote unit, contacts of relay 2C, winding of relay 2N1, diode 42, tip conductor T of the control trunk, winding of relay 3N1, diode 53, contacts of relays 3C and 3D to the ring conductor R of the control trunk and return.

At this time relay 2A operates over a path including the contacts of relay 2N2, and relay 2Z operates over a path including negative battery, winding of relay 2Z, contacts of relay 2C to ground. Relay 2B operates over the contacts of relay 2C.

It will be noted that the operation of the negative detector relays 2N1 and 3N1 are predicated on a current flow from the remote unit to the central office on the tip conductor which is arbitrarily defined as negative current on the loop.

At the central office, relay 3R1 is operated over a path including ground, contacts of relays 3Q, 3N1, 3B, 3E, 3C1, winding of relay 3R1 to negative battery.

As indicated in Table I (state 4), the central office is arranged to respond with a positive signal after registering the binary digit 1 in register relay 3R1 and to advance the counter to operate relay 3C1. For simplicity, the counter is shown as being advanced by a manual stepping switch although numerous other arrangements may be utilized.

At the central office unit, relay 3D operates over a path including ground, contacts of relays 3R1, 3C1-3C5, 3Q, 3E, 3A (previously operated at the contacts of relay 3N2), additional contacts of relay 3Q, winding of relay 3D to negative battery. Relay 3B operates over the contacts of relay 3D.

The positive current on the loop from relay 3D opposes the current from relay 2C (as shown graphically in FIG. 5) and all detector relays release resulting in the release of relay 2A.

*Transmit second digit, state 6*

At the remote unit, relay 2C is released at the contacts of relay 2N2. Relay 2D is operated at this time over a path from ground, contacts of relays 2R2, 2C1, 2C2–2C5, 2Q, 2A, 2Z, additional contacts of relay 2Q, winding of relay 2D to negative battery. Since positive current continues to be applied to the loop from the central office end, detector relays 2P1 and 3P1 are operated. Relay 2P1 operates over a path including battery 20, contacts of relay 2C, diode 43, winding of relay 2P1, tip conductor T of the control trunk, diode 52, winding of relay 3P1, contacts of relay 3C, battery 30, contacts of relay 3D, ring conductor R, and contacts of relay 2D. Relay 3A operates at the contacts of relay 3P2 and relay 3D releases at the contacts of relay 3P2. The release of relay 3D causes the delayed release of relay 3B.

Relays 2C2 and 3C2 are now operated by the respective manual switches. Relay 3R2 does not operate in view of the open contacts of relay 3P1 in series therewith, thereby storing a binary 0 in the second register relay (by allowing the relay to remain released). This completes the transmission and storage of second digit, 0.

At the central office, relay 3C is operated over a path including the contacts of relays 3P2, 3A (previously operated over contacts of relays 3P2), 3B, 3Q, winding of relay 3C to negative battery. Operation of relay 3C applies a negative "reply" current to the loop (state 6) and opposes the positive current at the contacts of relay 2D to reduce the current in the loop to substantially zero. Thereafter, all detector relays release and relay 2D releases.

*transmit third digit, state 7*

In consequence, relay 2C at the remote unit is operated over a path from ground, contacts of relays 2R3, 2C2, 2C3–2C5, 2Q, 2A, 2Z, additional contacts of relay 2Q, winding of relay 2C to negative battery. Operation of relay 2C operates relay 2Z and applies negative current to the loop. Relays 2N1 and 3N1, the negative detector relays, are operated whereupon relay 3C at the central office is released at the contacts of relay 3N2. The release of relay 3C causes the release of relay 3B.

The third digit is now registered in the central office over a path including ground, contacts of relays 3Q, 3N1, 3B, 3E, 3C1, 3C2, 3C3, winding of relay 3R3 to negative battery. Operation of relay 3R3 represents the storage in the third register of the third binary digit, 1. Counting relays 2C3 and 3C3 are operated in the usual manner.

*Transmit fourth digit, state 5*

Relay 3D is now operated over a path from ground, contacts of relays 3R3, 3C2–3C5, 3Q, 3E, 3A, additional contacts of relay 3Q, winding of relay 3D to negative batttery. Operation of relay 3D applies a positive "reply" current (state 7) to the control trunk which opposes that supplied by the remote unit and reduces the loop current to substantially zero releasing all detector relays. Relay 3D also operates relay 3E over a path including the contacts of relay 3Q.

At the remote unit, relay 2C now releases at the contacts of relay 2N2. Relay 2D is prevented from operating by contacts of relay 2Z. Relay 2B begins slow release. Since relay 3D is operated, the positive detector relays 2P1 and 3P1 operate (state 5) and, as a result, relay 3D itself releases at the contacts of relay 3P2 reducing the control trunk current to zero and releasing all detector relays.

At this time the fourth digit is registered in the central office over a path from ground, contacts of relays 3Q, 3P1, 3D, 3E, 3C1–3C3, 3C4, winding of relay 3R4 to negative battery. Subsequently, the counter is advanced at both units to operate relay 2C4 at the remote unit and relay 3C4 at the central office unit.

*Transmit fifth digit, state 2*

Relay 2D at the remote unit is operated over a path from ground, contacts of relays 2R5, 2C4, 2C5, 2Q, 2A, 2B, 2C, additional contacts of relay 2Q, winding of relay 2D to negative battery. Operation of relay 2D applies a current to the control loop which results in the operation of the positive detector relays 2P1 and 3P1.

In consequentce of the operation of relay 3P1 and its auxiliary relay 3P2, relay 3C is operated over a path from ground, contacts of relays 3P2, 3A, 3B, 3Q, winding of relay 3C to negative battery. Operation of relay 3C results in the application of a potential which produces a negative current in the loop. The opposing currents in the loop cause the release of the previously operated detector relays. At this time the counter is advanced to operate relay 2C5 at the remote unit and relay 3C5 at the central office. It will be noted that relay 3R5 does not operate in view of the open contacts of relay 3N1 in series therewith, thereby, in effect, storing a zero in the fifth register position in the register circuit at the central office. Thus far, the first five digits have been transmitted from the central office and stored in the remote unit.

The sixth digit to be transmitted is also a binary 0.

*Transmit sixth digit, state 3*

When the detector releases in view of the opposing loop currents, as described above, relay 2D is released at the contacts of relay 2P2. Since relay 3C remains operated, the remaining current in the loop is in the negative direction and as a result the negative detector relays 2N1 and 3N1 are operated. At the central office, relay 3C now releases at the contacts of relay 3N2 as do the detector relays and as a result a zero is stored in the sixth register 3R6 (which does not operate in view of the open contacts of relay 3N1) and relay 3C6 is operated in advancing the counter, and the circuit is once more in the standby condition (state 1) with zero current on the control trunk.

Thus, binary digits 101100 representing line 33 which it has been assumed is originating a call have been transmitted from the remote unit to the central office and stored in binary registers 3R1–3R6 thereat. In consequence, complete information representing the identity of the line requesting service is now available at the central office and appropriate switching actions may be taken to connect the termination in the central office line and cutoff relays (shown in dotted outline) unique to line 33, through the switching circuit at the central office, over an idle trunk to the remote unit. Thus, for example, trunk TK1 may be selected, if idle, and appropriate crosspoints closed in the remote switching circuit and the central office switching circuit to connect substation 33 over trunk TK1 to the termination in the central office line and cutoff relays unique to line 33. When the latter termination has been energized, conventional central office equipment arranged to respond to a service requesting line is activated and a dial pulse receiver is connected to the line termination to await dial pulsing of the called number, all as explained in my above-referred-to patent.

It is significant to observe in connection with the above detailed description of the signaling operation that the transmission of the binary data from the remote unit to the central office is predicated on the application of trinary signaling conditions to the control trunk (positive, negative and zero current) and, moreover, the reply signals as well as the transmitted binary signals feature the simultaneous application at appropriate intervals of aiding or opposing signal potentials at both ends of the control trunk. Although the illustration is based on an originating call which customarily requires the transmission of line identity information in a direction from the remote unit to the central office, it will be understood that the circuit is adapted to operate in the opposite direction. Thus, for example, on a terminating call, information regarding the called line identity must be transmitted in a direction from the central office to the remote unit. Register relays 3R1–3R6 are operated or released to store the binary representation of the called line identity in accordance with Table II as a result of the operation of the service request matrix at the central office and a conventional translation from the "A" and "B" subgroup identifications as described in my above-referred-to patent to the binary equivalent shown in Table II. Once the called line information is stored in the register relays 3R1–3R6, subsequent operations for transmitting and storing the corresponding binary registers 2R1–2R6 at the remote unit are, as described above, for an originating call.

It will be noted from FIG. 5 that, in those instances where the signal applied by the receiving terminal is the same as the current on the loop, the circuitry of the receiving equipment is adapted to remove the applied signal and to sense or examine the remaining signal on the line. Thus, for example, in the case of the transmission of the second digit, 0 (state 6), a positive current exists on the trunk. However, this positive current is ambiguous in the sense that it may be attributable to the positive current being applied at the sending terminal or the positive current being applied at the receiving terminals. To resolve the ambiguity, the receiving terminal returns to the standby condition and "examines" the remaining current on the line which is obviously due only to the sending terminal. Thus, the return to the standby condition at the receiving terminal still permits positive current to circulate in the control loop. This is a verification that a positive signal was applied at the sending terminal. Thus, the receiver registers a zero and replies with a negative signal in accordance with FIG. 6.

It will be noted that the same condition applies in other instances, for example in the transmission and reception of the third digit, 1 (state 7). The negative signal on the control loop is ambivalent in that it might have been a result of the negative current applied at the sending terminal or the receiving terminal. Consequently, in returning to the standby condition in state 7, the receiver senses that the current on the control loop remains negative and was therefore representative of a negative current applied at the sending terminal.

It will be further noted that after the transmission of the fourth digit, 1 (state 5), no reply signal is necessary. This is attributable to the fact that when the receiving terminal returned to the standby condition to ascertain whether the positive current on the loop in state 5 was due to the sending or receiving terminals, the current on the loop itself dropped to the standby condition indicating that the previous current was due only to the receiving terminal. Since the current in the loop changed during the "examination," a separate reply signal is unnecessary since the change in loop current suffices for this purpose. A similar situation applies with regard to the transmission of the last digit, 0 (state 3).

It is seen that the transmitting and receiving portions of the signaling system are wholly independent of marginal current conditions and instead are responsive only to trinary conditions on the loop. FIG. 5 reflects this type of nonmarginal operation by making no distinction between loop currents of a particular sense but varying intensity. The advantages inherent in this nonmarginal type of operation are apparent when it is considered that loop length, ground potentials and central office battery potentials are all subject to variations. In this respect it is also to be noted that the signaling which takes place on the loop is independent of ground potentials.

Moreover, the signaling system is adapted to operate wholly independently in the sense that it provides its own advancing information and does not require a clock source or other synchronous equipment.

It is to be understood that the above-described arrangements are illustrative of the application of the principles of the invention. Numerous other arrangements may be devised by those skilled in the art without departing from the spirit and scope of the invention.

What is claimed is:

1. A telephone line concentrator signaling system including a local unit and a remote unit, means at said units for transmitting and receiving trinary signal indications, means at said remote unit responsive to the reception of a first trinary signal indication from said local unit for comparing said signal indication with a prior signal indication and to register a particular binary indication in response to said comparison, and additional means at said remote unit responsive to the registration of said binary indication for transmitting a trinary verification signal to said local unit during the persistence of said first trinary signal indication.

2. A telephone line concentrator signaling system including a local signaling unit and a remote signaling unit, a single control trunk coupling said units, means at said remote unit responsive to the reception of a particular pulse signal from said local unit to compare said pulse signal with a prior pulse signal and to register the digit indication represented by said comparison, and additional means at said remote unit responsive to the registration of said digit indication to return a signal to said local unit over said control trunk during the persistence of said particular pulse signal to verify the reception of said digit indication.

3. A telephone line concentrator signaling circuit including a local unit and a distant unit, trinary signaling means at said units, receiving means at said units, registration means at said units, said receiving means at said distant unit being responsive to the transmission of a signal indication from said local unit to operate said registration means at said remote unit for storing a digital value represented by said signal indication, said receiving means including means for comparing said signal indication with a prior signal indication, and additional means in said remote unit responsive to the operation of said registration means for energizing said signaling means at said remote unit to transmit a verification signal to said local unit indicative of the storage of said digital value including means for transmitting said verification signal during the continuance of said signal indication transmitted from said local unit.

4. A telephone line concentrator signaling system including a local signaling unit and a remote signaling unit, a control trunk coupling said units, means at each of said units for applying a positive potential condition, a negative potential condition and a short-circuit condition to said trunk, means at said remote unit responsive to the application of said conditions to said control trunk by said local unit for comparing said conditions with prior signaling conditions on said control trunk and for registering digital values represented by said comparison, and additional means at said remote unit responsive to the registration of said digital values for applying verification signal conditions to said control trunk representative of the successful reception and registration of said digital values at said remote unit including means for applying said verification signal conditions to said control trunk during the continuance of the application of said signal conditions by said local unit.

5. A telephone line concentrator signaling system including a local unit and a remote unit, a control trunk for coupling said units, signaling means including first relay means and second relay means serially connected to said control trunk at said units, oppositely poled unidirectional current conducting means shunting each of said relay means, means at said units including said relay means for applying positive potential, negative potential, and short-circuit conditions to said trunk, said first and second relay means at said units being respectively responsive to the application of said potential conditions, means at said remote unit responsive to the transmission of a particular signaling condition from said local unit for comparing said signaling condition with a prior signaling condition on said trunk and registering a digital representation indicated by said comparison, and additional means in said remote unit responsive to the operation of said registration means for operating said relay means at said remote unit to return a verification signal to said local unit indicative of the registration of said digital value during the continuance of the signaling condition transmitted from said local unit.

6. In combination, a signaling circuit including a local unit and a remote unit, a control trunk coupling said units, means at said local unit for applying a particular trinary signaling condition to said control trunk, means at said remote unit responsive to the reception of said signaling conditions for comparing said signaling conditions with prior signal conditions on said trunk and for registering a digital value represented by said comparison, means at said remote unit for applying a signal condition to said control trunk verifying the reception of said particular trinary signal condition, and means at said local unit responsive to the joint application of said particular and verifying signaling conditions at said units for terminating said particular trinary signal condition.

7. In combination, a signaling system including a local unit and a remote unit, a control trunk coupling said units, means at said local unit for transmitting particular signal indications over said control trunk to said remote unit, and means in said remote unit responsive to the reception of said particular signal indications for applying a verification signal indication to said control trunk to oppose said particular signal indications and to indicate the accurate reception of said particular signal indications.

8. In combination, a signaling system including a signaling circuit comprising a local unit and a remote unit, a control trunk coupling said units, means at said local unit for transmitting particular trinary signal indications to said remote unit including trinary signaling means, means at said remote unit responsive to the reception of said particular trinary signal indications for applying additional trinary signal indications to said trunk jointly with the application of said particular signal indications to indicate the accurate reception of said particular signal indications.

9. A telephone signaling system including a remote signaling unit and a local signaling unit, a control trunk connecting said units, relay means at said local unit and said remote unit for sending and receiving trinary signal indications, means at said local unit for operating said relay means to transmit a particular signal indication representative of a particular binary digit, means at said remote unit responsive to the reception of said signaling indication for comparing said indication with a priorly received indication and registering the digital value represented by said comparison, additional means at said remote unit responsive to the registration of said digital value for applying a signal indication to said control trunk verifying the reception of said digital value, and means at said local unit responsive to the resultant current on said trunk generated by the joint application of said particular signal indication and said verifying signal indication by said local and remote units for terminating said particular signal indication.

10. A telephone signaling system including a local unit and a remote unit, trinary signaling means at said units, a control trunk coupling said units, means at said local unit for energizing said signaling means to transmit a particular trinary signal in response to a comparison of the prior signal on said control trunk and a digital value to be transmitted, means at said remote unit responsive to the reception of said particular signal for comparing said signal with said prior signal on said control trunk and for registering the digital value represented by said comparison, and additional means at said remote unit responsive to the registration of said digital value for transmitting a signal indication to said local unit over said control trunk during the continuance of said particular trinary signal.

11. A telephone system including a local unit and a remote unit, a control trunk coupling said units, means at said local unit for transmitting binary data to said remote unit including trinary signaling means at said remote unit, trinary receiving means at said remote unit, control relays at said local unit, means for operating said control relays to apply trinary signaling conditions to said control trunk, means at said remote unit including said signalling means responsive to the reception of a signal condition indicative of a particular binary digit for registering said binary digit and applying a reply signal to said control trunk, means at said local unit responsive to the reception of said reply signal for releasing said control relays and for re-energizing said control relays to apply a subsequent signal to said control trunk during the continuance of the application of said reply signal.

12. A signaling system including local signaling means and remote signaling means, a control trunk coupling said signaling means, said local signaling means comprising means for applying trinary signals to said control trunk to transmit binary information to said remote signaling means, said means for applying trinary signals including means responsive to the previous trinary signaling condition on said trunk and the binary digit to be transmitted for determining the particular trinary signal to be subsequently applied to transmit said binary information, and receiving means at said remote signaling means responsive to the reception of said trinary signal condition for comparing said trinary signal condition with the previous trinary signal condition on said trunk to determine the particular binary digit received.

13. A telephone line concentrator signaling system including a local signaling unit and a remote signaling unit, a conductive channel coupling said units, means at said units for applying trinary signaling conditions to said channel to transmit binary information between said units, means at said local unit for applying a first trinary condition to said channel to transmit a selected binary digit to said remote unit, said means for applying said trinary condition including means responsive to the previous signaling condition on said channel, and means at said remote unit responsive to the application of said first trinary signal condition to said channel to register said selected binary digit and to apply a second trinary signaling indication to said channel, said means at said remote unit for applying said second trinary signaling indication including means responsive to the previous trinary signaling condition of said channel.

14. A telephone line concentrator signaling system including a local unit and a remote unit, a signaling channel coupling said units, means at said units for applying trinary signaling conditions to said channel, detector means at said units responsive to said trinary signaling conditions, register means at said units for registering binary digits, means at said local unit responsive to the registration in said register means thereat of a binary digit for applying a particular trinary signaling condition to said channel indicative of said binary digit, said applying means including means responsive to the previous trinary signaling condition on said channel, said detector means being operative at both of said units in response to the application of said particular trinary signaling condition to said channel, means at said remote unit responsive to the operation of said detector means thereat and to the previous trinary signaling condition on said channel for operating said register means at said remote unit to store said binary digit, and additional means at said remote unit for applying another trinary signaling condition to said channel during the continuance of said particular trinary signaling condition to verify the accurate reception of said binary digit.

15. A telephone line concentrator signaling system including a local unit and a remote unit, a signaling channel coupling said units, means at said units for applying trinary signaling conditions to said channel, detector means at said units responsive to said trinary signaling conditions, register means at said units for registering binary digits, means at said local unit responsive to the registration in said register means thereat of a binary digit for applying a particular trinary signaling condition to said channel indicative of said binary digit, said applying means including means responsive to the previous trinary signaling condition on said channel, said detector means being operative at both of said units in response to the application of said particular trinary signaling condition to said channel, means at said remote unit responsive to the operation of said detector means thereat and to the previous trinary signaling condition on said channel for operating said register means at said remote unit to store said binary digit, and additional means at said remote unit for applying another trinary signaling condition to said channel during the continuance of said particular trinary signaling condition, and wherein said detector means at each of said units includes a first and second relay, means for coupling the operating windings of said first and second relays, first and second unidirectional current conducting devices connected in shunt with said first and second relays respectively to permit current of a first direction to operate a first relay in said local unit and a first detector relay in said remote unit and current of a second direction to operate a second relay in said local unit and a second relay in said remote unit.

16. A telephone line concentrator signaling system including a local unit and a remote unit, a signaling channel coupling said units, means at said units for applying trinary signaling conditions to said channel, detector means at said units responsive to said trinary signaling conditions, register means at said units for registering binary digits, means at said local unit responsive to the registration in said register means thereat of a binary digit for applying a particular trinary signaling condition to said channel indicative of said binary digit, said applying means including means responsive to the previous trinary signaling condition on said channel, said detector means being operative at both of said units in response to the application of said particular trinary signaling condition to said channel, means at said remote unit responsive to the operation of said detector means thereat and to the previous trinary signaling condition on said channel for operating said register means at said remote unit to store said binary digit, additional means at said remote unit for applying another trinary signaling condition to said channel during the continuance of said particular trinary signaling condition, wherein said register means includes a plurality of relays, and means for operating said relays to indicate a first binary condition and to release said relays to indicate a second binary condition, and including in addition counting means at said local unit and said remote unit for connecting said signaling means to said register relays in a sequence wherein the operation of said register means prior to the operation of said counting means indicates the storage of a binary 1 condition and the operation of said counting means without the operation of said register means indicates the storage of a binary zero condition.

17. A signaling system including a local unit and a remote unit, a channel coupling said units, means at said local unit for applying a signal current to said channel to transmit information to said remote unit, means at said remote unit responsive to the reception of said signal current for applying a predetermined reply signal current to said channel, and additional means at said remote unit responsive to the application of a reply signal current of the same sense as the current in said channel for removing said reply signal to verify that the sense of said last-mentioned current remains unaltered.

18. A nonmarginal signaling system including a local signaling unit and a remote signaling unit, a control channel coupling said units, means at each of said units for transmitting signal information through the appplication of signal currents to said control channels at each of said units concurrently, means at said remote unit responsive to the application of signal current to said control channel at said local unit for energizing said signal transmitting means at said remote unit to apply a reply current signal to said channel, and additional means at said remote unit effective on the application of a reply signal current of the same sense as the control channel current to ascertain the sense of the signal current due solely to the local unit to resolve any ambiguities arising therefrom, including means for discontinuing said application of reply signal current.

19. A telephone signaling system for use in telephone line concentrators including a local signaling unit, a remote signaling unit, a control channel coupling said units, means at said units for applying trinary signaling conditions to said control channel to transmit signal information between said local and remote units, means for energizing said local unit to apply a first trinary condition to said channel in accordance with a code to transmit a binary digit to said remote unit, means at said remote unit responsive to said first trinary condition to apply a further trinary condition to said control channel during the subsistence of said first trinary condition, and means at said remote unit responsive to the application of said further trinary condition thereat similar to the trinary condition subsisting on said control channel for modifying said further trinary condition signal to verify that said subsisting trinary condition continues unaltered.

20. A signaling system including a local signaling unit, a remote signaling unit, a control channel coupling said units, means at said local unit for applying signal conditions to said control channel representative of signal information to be transmitted to said remote unit, means at said remote unit responsive to the reception of said signal conditions for applying a verification signal condition to said control channel during the subsistence of said first signal condition, and means at said remote unit responsive to the transmission of a verification signal condition thereat which is the same as the signal condition priorly on said control channel for removing said verification signal condition, including means for ascertaining that the remaining signal condition of said channel is the same as said removed verification signal condition.

21. A signaling system including a local unit and a remote unit, a control channel coupling said units, means at said local unit for applying a signal current to said channel indicative of a digital value to be transmitted, means at said remote unit for concurrently applying a reply signal current to said channel indicative of the reception of said digital value, additional means at said remote unit responsive to the application of a reply signal current corresponding in sense to said current on said channel for modifying said reply signal current, and means at said remote unit responsive to a change in current direction on said control channel incident to said modification for omitting said reply signal.

22. A telephone signaling system including a local signaling unit and a remote signaling unit, a conductive channel coupling said units, means at said local unit for transmitting binary data to said remote unit including means for applying trinary signal conditions to said conductive channel, additional means at said local unit effective prior to the transmission of a particular binary digit to said remote unit for comparing said particular binary digit with the trinary signaling condition extant on said conductive channel, means at said remote unit responsive to the reception of said particular binary digit for applying a trinary verification signal to said conductive channel during the continuance of said trinary signaling condition from said local unit, and additional means at said remote unit effective prior to the application of said verification signal for comparing the particular binary digit received with the trinary signaling condition extant on said conductive channel to select said trinary verification signal.

23. A signaling system including a local signal unit and remote signal unit, a signal trunk coupling said units, means at said local unit for transmitting particular signal conditions to said remote unit, and means at said remote unit responsive to the accurate reception of signal conditions transmitted from said local unit for applying a verification signal condition to said signal trunk concurrently with the transmission of said signal condition from said local unit, said means for applying said verification signal including means jointly responsive to the prior signal condition on said signal trunk previous to said transmission of said particular signal condition from said local unit and to the present signal condition transmitted from said local unit.

24. A signaling system including a local unit and a remote unit, a conductive channel coupling said units, means at said local unit for transmitting signal conditions to said remote unit, said means at said local unit including means for comparing the signal condition to be transmitted with the signal condition priorly on said conductive channel, and means at said remote unit responsive to the reception of said signal conditions for applying verification signal conditions to said conductive channel during the transmission of said signal conditions from said local unit, said means at said remote unit including means for comparing the signal conditions received with the signal conditions priorly on said conductive channel.

References Cited by the Examiner

UNITED STATES PATENTS

| | | | |
|---|---|---|---|
| 2,641,692 | 6/53 | Lewis | 179—2 |
| 2,871,289 | 1/59 | Cox et al. | 178—23 |
| 2,912,684 | 11/59 | Steele | 340—172 XR |

ROBERT H. ROSE, *Primary Examiner.*